PUSHBUTTON MECHANISM WITH WIPING ACTION CONTACT

Filed April 19, 1966

INVENTORS
Horst Robert Adolf Ziegler
Peter Stauffer
BY
Hane and Nydick
Attorneys

United States Patent Office 3,392,250
Patented July 9, 1968

3,392,250

PUSHBUTTON MECHANISM WITH WIPING ACTION CONTACT

Horst Ziegler, Johanneshov, and Peter Stauffer, Tyreso, Sweden, assignors to Telefonaktiebolaget L. M. Ericsson, Stockholm, Sweden, a corporation of Sweden Filed Apr. 19, 1966, Ser. No. 543,676
Claims priority, application Sweden, Apr. 28, 1965, 5,540/65
13 Claims. (Cl. 200—159)

ABSTRACT OF THE DISCLOSURE

There is disclosed a circuit assemblage comprising a printed circuit board and a pushbutton switching device for switching conductors of the circuit board. The device comprises a V-shaped contact spring one leg of which is biased into engagement with a stationary switch contact provided within a hole of the board. Depression of the pushbutton of the device forces said one spring leg out of engagement with the switch contact, preferably after having first performed a sliding movement in reference to the contact.

Figure 1:
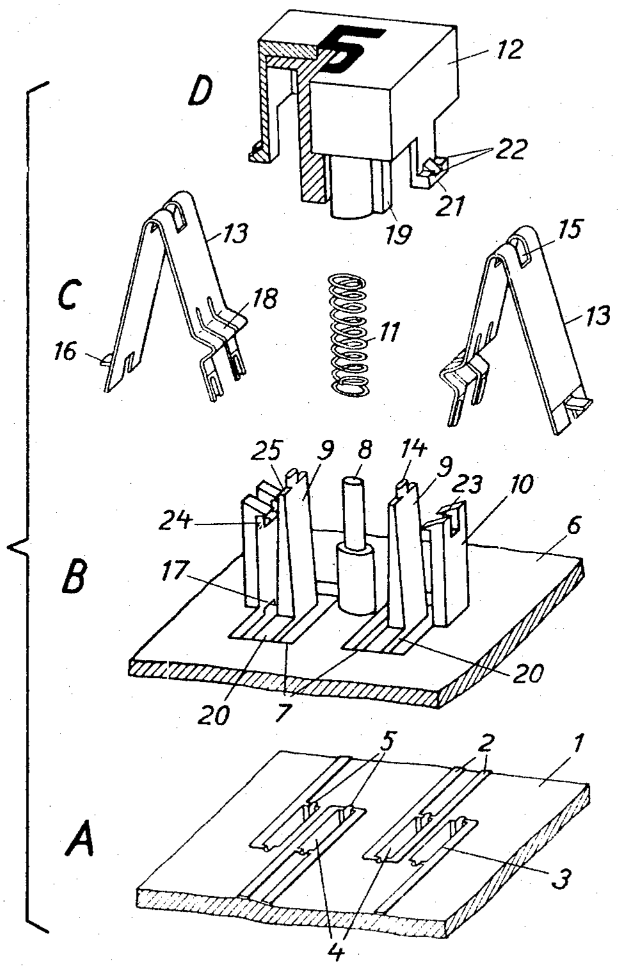

The present invention refers to a pushbutton device, specially for use with printed circuits arranged on a board. Such pushbutton devices are used for instance in pushbutton sets for pulsing in the operator's circuit of switchboards, or in telephone instruments and so on. In a known device conventional contact spring groups are used, which have the advantage of providing a satisfactory sliding between the contact parts at the moment of contact closing. This device, however, has the disadvantage of having relatively long springs, a fact that results in large space requirements and in the use of a plurality of components, which in turn causes a fairly complicated mounting procedure. In order to avoid these disadvantages, devices have been proposed that comprise movable springs suitably anchored to the board and which by means of their movable end make contact with a fixed contact on the board surface. These springs can be made relatively short to require small space but have the disadvantage of not giving a satisfactory contact sliding.

The invention constitutes an improvement compared to the known devices as it avoids all their disadvantages. This is achieved by the contact springs being designed as double springs, which are supported by cams projecting from the surface of the board and the branches of which are inserted in holes in the board and that the fixed contacts are composed of contact surfaces provided on the walls of said holes.

In the accompanying drawing a preferred embodiment of the invention is shown by way of illustration and not by way of limitation.

In the drawing:

FIG. 1 is an exploded view of a circuit assemblage according to the invention; and FIGS. 2*a* to 2*e* are diagrammatic views of several operational stages of the pushbutton switch of the circuit assemblage.

On a board 1 there are provided conductors 2 in the form of printed circuits. Adjacent to the conductors 2 are holes 3 punched in the card. By means of metal plating produced by a galvanic process, fixed contact surfaces 4 are provided on the walls of the holes, which contact surfaces have electrically conducting connection to the conductors alongside the holes.

At the device shown in FIG. 1A two contact surfaces are provided in each hole along its long sides. These contact surfaces are produced by first forming a continuous metal coating on the walls of the hole and then by punching or cutting out a recess at the short ends of the hole to obtain two electrically separated contact surfaces. By metal plating carried out by a galvanic process one can easily obtain a metal coating of the desired thickness and mechanical strength.

FIG. 1B shows a mounting plate 6 of moulded plastic material for carrying the movable parts of the pushbutton device. Plate 6 is superimposed upon board 1 when the device is assembled. The mounting plate is provided with openings 7 corresponding to the holes 3 of card 1. In order to support the movable parts, the mounting plate 6 is provided with posts 8, 9 and 10. On the post 8 a pushbutton 12 (FIG. 1D) is mounted together with a helical spring 11 (FIG. 1C). The two posts 9 are for each pushbutton, carry each a contact spring 13. The contact springs are mounted with their apices on the upper end of the posts which for the purpose are of generally V-shaped configuration formed as a support cam 25. A hole 15 in the spring 13 is placed upon a projection or lug 14 of the support cam and the two legs or branches of each contact spring are inserted through the respective opening 7 of the mounting plate 6 into the holes 3 of the board 1. In order to retain the contact springs in position each spring is provided with a bent out tongue 16 that engages a recess 17 in the lower edge of the opening 7. In the mounted position the contact springs make contact by means of their branch ends with fixed contacts 4 in the hole 3.

Each contact spring 13 is provided with a bent-out portion 18 which when the respective button 12 is depressed, is actuated by means of a ridge 19 of said pushbutton. The movement of a contact spring when one of the respective pushbuttons is depressed, is further described below with reference to FIG. 2.

The posts 9 are joined to the mounting plate 6 by means of a flexible part 20, which makes the posts resilient in their longitudinal direction.

Each button 12 is provided on both sides with a projection 21 which in cooperation with a corresponding projection on the posts 10 partly determines the home uppermost position of the buttons, and partly gives it a convenient trigger pressure. In the home position each button is pressed upwardly by a spring 11, so that the projection 21 abuts with horizontal surfaces 22 against hooks 23 in the corresponding post 10. When a pushbutton is pressed down, the center part of its projection 21 is at the beginning of the displacement pressed against a somewhat rounded knob 24 on the respective post to obtain a trigger action. Said knob 24 is only passed at a predetermined pressure on the button whereby a desired control of the subsequent downward movement of the button is obtained.

Figures 2A, 2B, 2C, 2D, 2E:
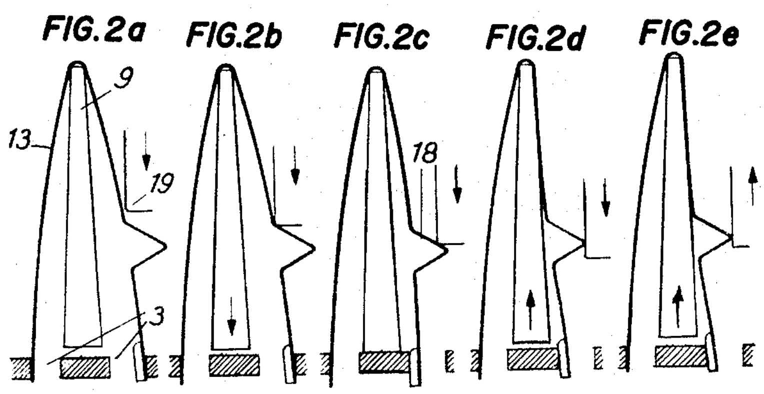

In FIG. 2 one of the contact springs 13 is shown in five different phases during the displacement of the button 12. FIG. 2*a* shows the home position. In this position the contact spring by means of its own resiliency makes contact with the wall surfaces most distantly located in relation to each other in the respective holes 3. In FIG. 2*b* the ridge 19 of the pushbutton has come into engagement with the contact spring 13 whereby said spring, together with the post 9, is displaced somewhat downwards. In FIG. 2*c* the post has reached its bottom position, and the actuated branch of the spring has been forced into engagement with the other side of the hole. During the subsequent downward movement of the button the spring is subjected to an increasing force by the ridge, until the tip of the ridge has passed the apex of the bent-out portion and the side wall of the ridge engages the bent-out portion. In FIG. 2*d* the bent-out portion abuts against the side of the ridge and the post 9 has by its resiliency moved the spring somewhat upwards, although the pushbutton still is moving downwards. In FIG. 2e the pushbutton is moving upwards. The post has reached its original position but the pushbutton still actuates the spring because the bent-out portion still abuts against the outside of the ridge. Immediately thereafter the pushbutton returns into its original position and the spring returns to the position shown in FIG. 2a. Thus, a satisfactory sliding is with certainty obtained between the movable and the fixed contact, which gives a good contact at closure and counteracts corrosion of the contact surfaces.

In the shown embodiment only a single pushbutton mechanism is shown with only two contact springs and with the movable parts mounted on the mounting plate 6. If desired, the pushbutton switch can be designed with a greater number of springs, for instance for four contact springs. When manufacturing a pushbutton set with a plurality of for instance ten buttons, it is of advantage that the movable parts of all the pushbuttons may be mounted as a single unit on a common mounting plate that is detachable from the printed circuit board for eventual replacements.

We claim:

1. A circuit assemblage comprising in combination:

a printed circuit board including a hole through the board, a wall portion of said hole being lined with a conductive layer electrically connected to the printed circuit;

a pushbutton device, said device comprising:

- a first post mounted normal in reference to said board in substantial alignment with the hole therethrough;
- a second post mounted normal to said board;
- a generally V-shaped contact spring pivotally supported at its apex on the tip of the first post straddling the same, the legs of the spring extending into said hole on opposite sides of the first post, one of said legs being spring biased into engagement with said lined wall portion and the other leg being spring biased into engagement with an opposite wall portion of the hole; and
- an actuating member supported by the second post for up and down displacement thereon in reference to the printed circuit board, said actuating member including a projection engaging said one leg of the spring to force said leg out of engagement with said lined wall portion and to retain said leg in the disengaged position when and while the actuating member is a selected distance below its uppermost position.

2. The circuit assemblage according to claim 1 and further comprising spring means biasing said actuating member toward its uppermost position.

3. The circuit assemblage according to claim 2 wherein said actuating member is in the form of a pushbutton, and said spring means is a coil spring encompassing said second post and disposed between said pushbutton and said printed circuit board.

4. The circuit assemblage according to claim 1 wherein said one leg of the spring has intermediate its length an outwardly protruding projection, said projection being engageable with the projection on the actuating member.

5. The circuit assemblage according to claim 4 wherein the projection on said one leg of the contact spring is in the form of an outwardly bent leg portion of tapered configuration.

6. The circuit assemblage according to claim 1 wherein said one leg of the contact spring has intermediate its length an outwardly tapered projection, and wherein said projection on the actuating member comprises a rib elongated in the direction of the up and down displacement of the actuating member.

7. The circuit assemblage according to claim 6 and further comprising yieldable mounting means mounting the first post lengthwise displaceable, the yieldable action of the mounting means urging said post upwardly in reference to the printed circuit board, said rib upon a downward movement of the actuating member first engaging the upwardly facing surface of the projection on the spring leg with its tip thereby pressing the spring downwardly conjointly with the first post thus causing a sliding movement of said leg in reference to said lined wall portion and then engaging the apex of the projection on the spring leg with its side wall thereby forcing said spring leg out of engagement with said side lined wall portion.

8. The circuit assemblage according to claim 7 wherein said yieldable mounting means comprises an insulation plate superimposed upon one side of said printed circuit board, said plate including a hole therethrough disposed in registry with the hole through the printed circuit board, and a flexible tongue extending into the hole through said plate and supporting said first post.

9. The circuit assemblage according to claim 8 wherein said second post is fixedly mounted on said insulation plate.

10. The circuit assemblage according to claim 1 wherein said first post at its end supporting the contact spring terminates in a cam means permitting a swivel motion of the spring supported thereon.

11. The circuit assemblage according to claim 10 wherein said cam means comprises a flat elongate top surface of the first post and a lug rising from said surface intermediate the length thereof, said V-shaped contact spring being in the form of a bent flat strip having at its apex a hole engaged with said lug.

12. The circuit assemblage according to claim 1 wherein the other leg of said contact spring is releasably retained in a wall portion of said hole opposite the lined wall portion thereof.

13. The circuit assemblage according to claim 1 and further comprising a yieldable restraining means interposed in the path of the downward movement of the actuating member, said restraining means resisting the downward movement with a predetermined limited force to effect a trigger action when the actuating member is depressed past said restraining means.

References Cited

UNITED STATES PATENTS

| | | | |
|---|---|---|---|
| 2,761,936 | 9/1956 | Verkuil | 200—166.1 XR |
| 3,094,591 | 6/1963 | Hill | 200—5 |

FOREIGN PATENTS

| | | |
|---|---|---|
| 517,341 | 1/1940 | Great Britain. |

ROBERT K. SCHAEFER, *Primary Examiner.*

H. BURKS, *Assistant Examiner.*